(12) United States Patent
Lin et al.

(10) Patent No.: US 8,868,472 B1
(45) Date of Patent: Oct. 21, 2014

(54) CONFIDENCE SCORING IN PREDICTIVE MODELING

(75) Inventors: Wei-Hao Lin, New York, NY (US); Travis H. K. Green, New York, NY (US); Robert Kaplow, New York, NY (US); Gang Fu, Kearny, NJ (US); Gideon S. Mann, New York, NY (US)

(73) Assignee: Google Inc., Mountain View, CA (US)

( * ) Notice: Subject to any disclaimer, the term of this patent is extended or adjusted under 35 U.S.C. 154(b) by 402 days.

(21) Appl. No.: 13/272,178

(22) Filed: Oct. 12, 2011

Related U.S. Application Data

(60) Provisional application No. 61/497,474, filed on Jun. 15, 2011.

(51) Int. Cl.
G06F 15/18 (2006.01)

(52) U.S. Cl.
USPC .......................................................... 706/12

(58) Field of Classification Search
USPC .......................................................... 706/12
See application file for complete search history.

(56) References Cited

U.S. PATENT DOCUMENTS

| | | | |
|---|---|---|---|
| 7,349,919 | B2 | 3/2008 | Russell et al. |
| 8,209,271 | B1 | 6/2012 | Lin et al. |
| 8,209,274 | B1 | 6/2012 | Lin et al. |
| 8,229,864 | B1 | 7/2012 | Lin et al. |
| 8,301,498 | B1 | 10/2012 | Cortes |
| 8,370,280 | B1 * | 2/2013 | Lin et al. .......................... 706/12 |
| 2003/0212851 | A1 | 11/2003 | Drescher et al. |
| 2005/0234753 | A1 | 10/2005 | Pinto et al. |
| 2006/0230035 | A1 * | 10/2006 | Bailey et al. ....................... 707/5 |
| 2009/0106178 | A1 | 4/2009 | Chu |

OTHER PUBLICATIONS

Gerds, Thomas A., and Mark A. van de Wiel. "Confidence scores for prediction models." Biometrical Journal 53.2 (2011): 259-274. Article first published online: Feb. 17, 2011.*

Wu and Chen. A Novel Nonparametric Regression Ensemble for Rainfall Forecasting Using Particle Swarm Optimization Technique Coupled with Artificial Neural Network. Advances in Neural Networks—ISNN 2009 Lecture Notes in Computer Science vol. 5553, 2009, pp. 49-58.*

Duchi, John, et al., "Boosting with Structural Sparsity", 2009, cs.berkeley.edu [online] [Retrieved on Jan. 25, 2011]. Retrieved from the Internet: <URL: http://www.cs.berkeley.edu/~jduchi/projects/DuchiSi09d.pdf>, 41 pages.

(Continued)

Primary Examiner — Jeffrey A Gaffin
Assistant Examiner — David H Kim
(74) Attorney, Agent, or Firm — Fish & Richardson P.C.

(57) ABSTRACT

Methods, systems, and apparatus, including computer programs encoded on a computer storage medium, for receiving a plurality of first training examples, training a first predictive model using the first training examples, for each example in the first training examples, providing the first features of the example to the trained first predictive model to generate a respective first prediction, generating a second training example for each of the first training examples, wherein the second training example comprises the first features of the first training example and an answer that indicates whether the first answer of the first training example matches the respective first prediction of the first training example, training a second predictive model using the second training examples, and using the trained second predictive model to determine a confidence score for a prediction generated by the trained first predictive model.

27 Claims, 6 Drawing Sheets

(56) References Cited

OTHER PUBLICATIONS

Duchi, John, et al., "Boosting with Structural Sparsity", Proceedings of the 26th International Conference on Machine Learning, Montreal, Canada, 2009, cs.berkeley.edu [online] [Retrieved on Jan. 25, 2011]. Retrieved from the Internet: <URL: http://www.cs.berkeley.edu/~jduchi/projects/DuchiSi09a.pdf>, 8 pages.

R-Project web pages, 190 pages [online]. [Retrieved on May 18, 2010]. Retrieved from the Internet: <URL: http://www.r-project.org/>, 190 pages.

Uclassify web pages, [online] [Retrieved on May 18, 2010]. Retrieved from the Internet: <URL: http://www.uclassify.com/>, 16 pages.

Zementis web pages [online] [Retrieved on May 18, 2010]. Retrieved from the Internet: <URL: http://www.zementis.com/>, 34 pages.

Weiss, Integrating Real-Time Predictive Analytics into SAP Applications [online], Dec. 30, 2009 [retrieved on Sep. 29, 2011], Retrieved from the Internet: ,URL:http://www.sdn.sap.com/irj/scn/go/portal/prtroot/docs/library/uuid/a07faefd-61d7-2c10-bba6-89ac5ffc302c?QuickLink=index&overridelayout=true>, 1 page.

Hutter, et al., "Performance Prediction and Automated Tuning of Randomized and Parametric Algorithms,", Principles and Practice of Constraint Programing, Lecture Notes in Computer Science, 2006, 15 pages.

SAS Rapid Predictive Modeler, Overview, 2010, 4 pages.

Postema, et al., "A Decision Support Tool for Tuning Parameters in a Machine Learning Algorithm", Nanyang Techonological University, 1997, 9 pages.

"Active learning (machine learning)," Wikipedia, the free encyclopedia, [online] [retrieved on Sep. 8, 2011]. Retrieved from the Internet: http://en.wikipedia.org/wiki/Active learning (machine learning), 3 pages.

\* cited by examiner

CONFIDENCE SCORING IN PREDICTIVE MODELING

CROSS-REFERENCE TO RELATED APPLICATIONS

This application claims the benefit under 35 U.S.C. §119 (e) of U.S. Provisional Application Ser. No. 61/497,474, filed on Jun. 15, 2011 entitled "Confidence Scoring in Predictive Modeling," the entirety of which is hereby incorporated by reference.

BACKGROUND

This specification relates to predictive models.

Predictive modeling generally refers to techniques for extracting information from data to build a model that can predict an output from a given input. Predicting an output can include predicting future trends or behavior patterns, or performing sentiment analysis, to name a few examples. Various types of predictive models can be used to analyze data and generate predictive outputs. Examples of predictive models include Naive Bayes classifiers, k-nearest neighbor classifiers, support vector machines, and logistic regression techniques, for example. Typically, a predictive model is trained with training data that includes input data and output data that mirror the form of input data that will be entered into the predictive model and the desired predictive output, respectively. The amount of training data that may be required to train a predictive model can be large, e.g., in the order of gigabytes or terabytes. The number of different types of predictive models available is extensive, and different models behave differently depending on the type of input data. Additionally, a particular type of predictive model can be made to behave differently, for example, by adjusting the hyper-parameters or via feature induction or selection.

SUMMARY

This specification describes technologies relating to the provision of confidence scores for predictions made by a trained predictive model. Confidence scores are typically used to provide a measurement of accuracy for a given valuation, such that a high confidence score is an indication that the valuation is accurate, whereas a low confidence score is an indication that the valuation is inaccurate. In the predictive model context, confidence scores can be used to measure the accuracy of predictions made by a predictive model.

In general, the usefulness of a trained predictive model rests on the ability of the model to provide accurate predictions. Inaccurate predictive models can ordinarily be remedied by supplying additional training examples, thereby allowing the model to learn and refine patterns using the new examples. In some situations, a predictive model may generate inaccurate predictions for a particular category or feature space. In such instances, the identification of such inaccuracies can allow an operator to improve the predictive model by supplying new training examples that are directed to the deficient category or feature space.

In various implementations, a machine learning system maintains a confidence score predictive model for each trained predictive model. In such implementations, the confidence score predictive model is used to generate confidence scores for predictions made by the corresponding trained predictive model. As a result, a machine learning system can generate a prediction using the trained predictive model, together with a corresponding confidence score for that prediction using the confidence score predictive model.

In general, one aspect of the subject matter described in the specification can be embodied in methods that include the actions of receiving a plurality of first training examples, wherein each example in the first training examples comprises one or more first features and a first answer; training a first predictive model using the first training examples; for each example in the first training examples, providing the first features of the example to the trained first predictive model to generate a respective first prediction; generating a second training example for each of the first training examples, wherein the second training example comprises the first features of the first training example and an answer that indicates whether the first answer of the first training example matches the respective first prediction of the first training example; training a second predictive model using the second training examples; and using the trained second predictive model to determine a confidence score for a prediction generated by the trained first predictive model. Other embodiments of this aspect include corresponding systems, apparatus, and computer programs.

These and other aspects can optionally include one or more of the following features. The second predictive model can be configured to employ logistic regression techniques. The second predictive model can be configured to employ nonparametric classification techniques. The second predictive model can be configured to employ ensemble learning techniques. The first predictive model can be a categorical model. The confidence score can represent a probability reflecting an accuracy of the prediction generated by the trained first predictive model. The trained second predictive model can determine that the confidence score satisfies a predefined threshold and, in response to determining that the confidence score satisfies the predefined threshold, can send the prediction to a client. The trained second predictive can determine that the confidence score does not satisfy a predefined threshold and, in response to determining that the confidence score does not satisfy the predefined threshold, can indicate to a client that the confidence score has failed to satisfy the predefined threshold. The method can further include receiving a plurality of queries; generating confidence scores for the queries using the trained second predictive model; and identifying queries having confidence scores that fail to meet a predefined threshold. The training of the second trained predictive model can be accomplished on a streaming basis, where the second trained predictive model is further trained upon receipt of additional training examples for training the first predictive model.

Particular embodiments of the subject matter described in this specification can be implemented so as to realize one or more of the following advantages. Confidence scores are provided for predictions made by a trained predictive model. In this regard, confidence scores can be used to determine the reliability of predictions made by a predictive model. By virtue of this feature, a machine learning system can be configured to filter reliable predictions from unreliable predictions. Moreover, a confidence score predictive model can be used to identify weaknesses in a trained predictive model. As a result of this identification, the accuracy of a trained predictive model can be improved by taking appropriate steps, such as supplying additional training examples to further train the predictive model.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In various implementations, a predictive model (or "model") is either a categorical model if its predictions are categories, or is a regression model if its predictions are numeric. A predictive model is trained using training data. Training data encompasses examples that each comprise one or more data fields (or "features") plus an answer (a category or a numeric value) for that example. By way of illustration, the training data in TABLE 1 consists of training examples for a predictive model. These training examples are composed of email message subject lines and a category that indicates whether each example represents SPAM.

TABLE 1

| EMAIL SUBJECT LINE | CATEGORY |
|---|---|
| "You've won a free trip to Barbados!" | "spam" |
| "Happy hour" | "not spam" |
| "Lowest interest rates ever!" | "spam" |
| "Your Order Confirmation" | "not spam" |

After a model has been trained against training data, queries can be submitted to the model. In some implementations, queries are similar in form to training examples: that is, a query has the same or fewer data fields as the training examples but does not include an answer. The trained model uses patterns learned from the training data to find either the closest category for the submitted query (in the case of a categorical model) or estimate a numerical value for the query (in the case of a regression model).

Using a similar process, a confidence score predictive model can be trained to provide confidence scores for predictions made by a corresponding trained predictive model. The confidence score predictive model is trained using training examples comprising an <x, w> data pair, where x represents a set of one or more features from a training example, and where w represents a value indicating whether the trained predictive model achieves the correct answer. In the present example, x represents the same features that were included in the training examples used to train the predictive model, e.g., the email message subject lines. A corresponding answer w represents the accuracy of a prediction made for a feature by the trained predictive model. Further to this example, an answer w is set to '1' if the trained predictive model correctly predicted that "Happy hour" was "not spam," otherwise, the answer w is set to '0'. This process is described in more detail below in connection with FIG. 2. In various implementations, the confidence sore predictive model can be trained on a streaming basis, such that the confidence score training model is trained on an ongoing basis whenever one or more users submit new training examples to the predictive model. In such implementations, the confidence score training model is trained in a manner similar to the one described above, for example, using an <x, w> data pair, where x represents a set of one or more features from a training example, and where w represents a value indicating whether the trained predictive model achieves the correct answer.

Figure 1:
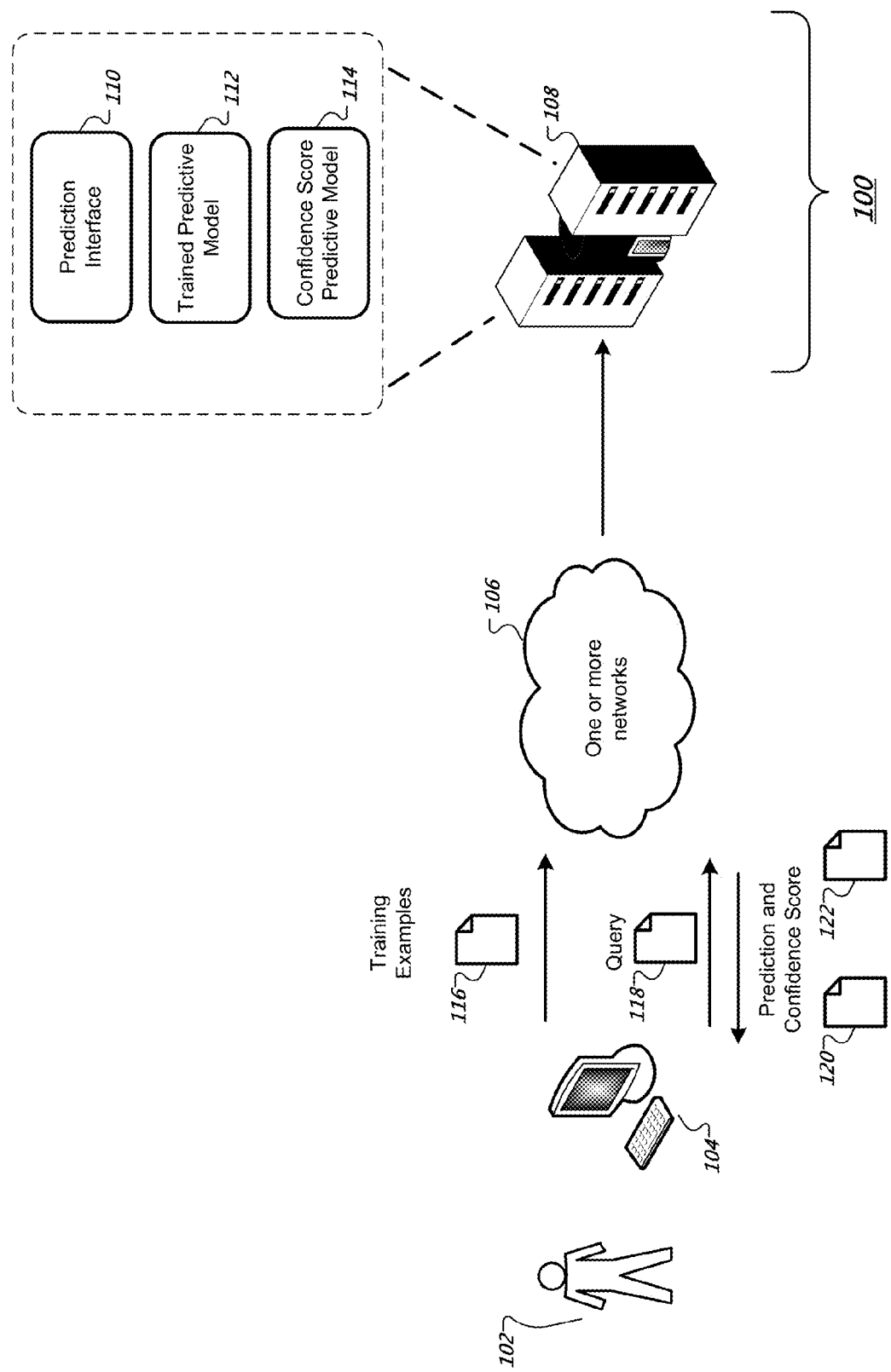
FIG. 1 illustrates interaction between a client and an example predictive modeling system.

FIG. 1 illustrates interaction between a client and an example predictive modeling system 100. A user 102 interacts with a client computing device 104 (or "client") to access a prediction interface 110 for submitting training examples 116 to the system 100, and to submit queries 118 to the system. The prediction interface 110 can be a web application executing on one or more server computing devices (or "servers") that are accessed over a network 106, such as the Internet, by the user 102. Software that implements the prediction interface 110 executes on one or more servers in a data warehouse 108, for instance, that houses hundreds or thousands of servers. The user 102 can interact with the prediction interface 110 by using a web browser or other software that executes on the client 104. The prediction interface 110 can provide a graphical user interface (GUI) to the client 104 by sending the client 104 Hypertext Markup Language (HTML) documents or other information that can be used to render the GUI.

Training examples 116 received by the system are used to train a predictive model 112. Training examples 116 are also used to generate new training examples for training a confidence score predictive model 114. Once a predictive model is trained, the trained predictive model 112 can be used to provide a prediction 120 for a query 118. In addition, the system can provide a confidence score 122 for the prediction 120 using the confidence score predictive model 114. The confidence score 122 indicates the accuracy of the prediction 120. In particular, the confidence score 122 allows the user 102 to determine the amount of confidence to assign to the prediction 120. In addition, the confidence score 122 allows the user 102 or a process to determine weaknesses in the trained predictive model 112, thereby allowing the user 102 or a process to take appropriate action to remedy such weaknesses such as, for instance, supplying additional training examples for further training the predictive model 112.

Figure 2:
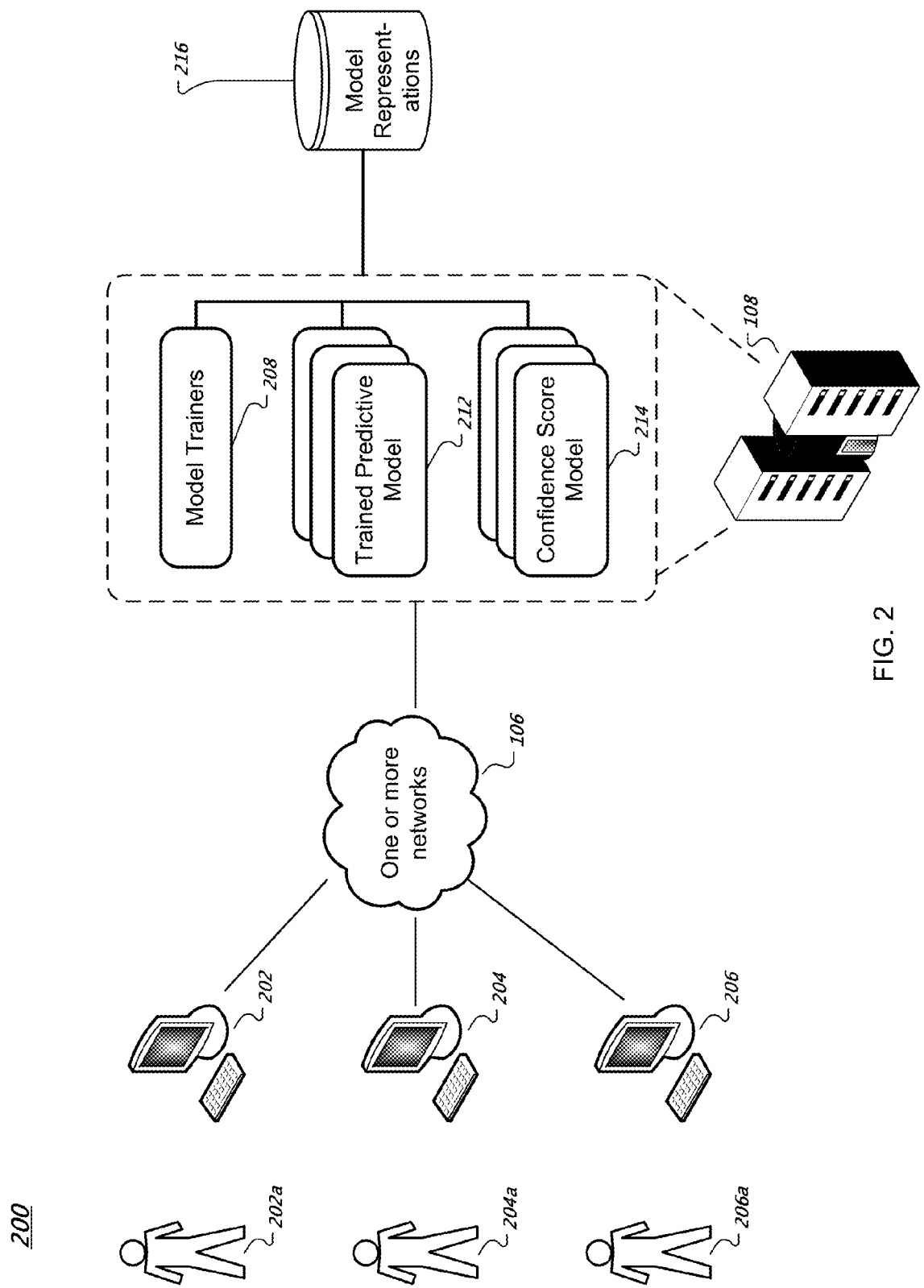
FIG. 2 illustrates an example predictive modeling system.

FIG. 2 illustrates an example predictive modeling system 200. The system 200 includes one or more clients (e.g., clients 202, 204 and 206) that can communicate through one or more networks 106 with a collection of remote servers, such as servers deployed in a data center 108 or in different geographic locations. A given server comprises one or more data processing apparatus. The servers can communicate with each other and with storage systems (e.g., model representation storage system 216) at various times using one or more computer networks or other communication means. For example, the servers in the data center 108 can be coupled to an intranet. A computer program can execute on a single server or, alternatively, the program can be organized into components that execute on multiple servers. There can be more than one instance or copy of a given computer program executing on the collection of servers at any given time. Multiple copies of a computer program that implements a predictive model or a confidence score predictive model, for instance, can be executing at the same time on one or more servers. These computer programs can be executed in parallel by the servers.

The model trainers 208 are configured to build models using the submitted training examples 116 (FIG. 1). Model trainers 208 can also be used to build models for providing confidence scores. Such models can be built using various machine learning algorithms, such as, logistic regression techniques, nonparametric classification techniques, and ensemble learning techniques. Trained predictive models 212 and confidence score models 214 can be stored as model representations in the storage system 216. In some implementations, the model representation is a Predictive Model Markup Language (PMML) document. PMML is an eXtensible Markup Language (XML)-based language. Other model representations are possible such as, for example, formatted or unformatted text. The PMML specification is an XML schema. Instances of models are XML documents that conform to the schema. A PMML document can represent more than one model. Generally speaking, a PMML document can contain some or all of the information described in TABLE 2. The PMML document can also contain information not described in TABLE 2.

TABLE 2

| SECTION | DESCRIPTION |
| --- | --- |
| Header | The header contains general information about the PMML document, such as copyright information for the model, its description, and information about the application used to generate the model. |
| Data Dictionary | The data dictionary contains definitions for all the possible fields used by the model. |
| Data Transformations | The data transformations specify mappings of user data into different forms to be used by the model. |
| Model | Contains the definition of the particular model. |
| Mining Schema | The mining schema lists all fields used in the model. This can be a subset of the fields as defined in the data dictionary. It contains specific information about each field, such as the field's name and what should happened when there is a missing value. |
| Targets | Targets specify post-processing for the predicted value. |
| Output | The output provides a name any output fields expected from the model, including the predicted value. |

The model representations can be used to invoke the models 212 and 214 which are computer programs that execute on one or more servers, each according to a model representation. A given model (e.g., a support vector machine) can have a number of different possible model implementations. For example, a model implementation can be a computer program that is designed to execute on a single server or it can be designed to execute on multiple servers.

A confidence score predictive model is trained to generate confidence scores for predictions made by a corresponding trained predictive model. In some implementations, a confidence score predictive model is trained using new training examples that are generated from the same training examples (e.g., training examples 116) that were used to train a corresponding predictive model 212 (FIG. 1). By way of example, a predictive model may be trained using training examples comprising an <x, y> data pair, where x represents a set of one or more features, and where y represents a corresponding answer. A corresponding confidence score predictive model is trained using training examples comprising an <x, w> data pair, where x represents the same features included in the <x, y> data pair, and where w represents an indication as to whether the trained predictive model correctly predicted the answer for the set of features x. In some implementations, a prediction correctness w can be determined by submitting to the trained predictive model a query for the set of features x, and by comparing a generated prediction p with an answer y, where y is the answer that corresponds to the set of features x, and where p is a prediction for the set of features x that was generated by the trained predictive model. In a case where the prediction p matches the answer y, w can be set to '1'. Otherwise, w can be set to '0'.

By way of illustration, the training data in TABLE 3 depicts example training data comprising a set of features x, together with a corresponding answer y, a generated prediction p, and a determined prediction correctness w. As indicated above, x (the "email subject line") and y (the "category") are used to train the predictive model, while x (the "email subject line") and w (the "prediction correctness") are used to train a corresponding confidence score predictive model.

TABLE 3

| EMAIL SUBJECT LINE (X) | CATEGORY (y) | PREDICTION (p) | PREDICTION CORRECTNESS (w) |
| --- | --- | --- | --- |
| "You've won a free trip to Barbados!" | "spam" | "spam" | "1" |
| "Happy hour" | "not spam" | "spam" | "0" |
| "Lowest interest rates ever!" | "spam" | "not spam" | "0" |
| "Your Order Confirmation" | "not spam" | "not spam" | "1" |

Figure 3:
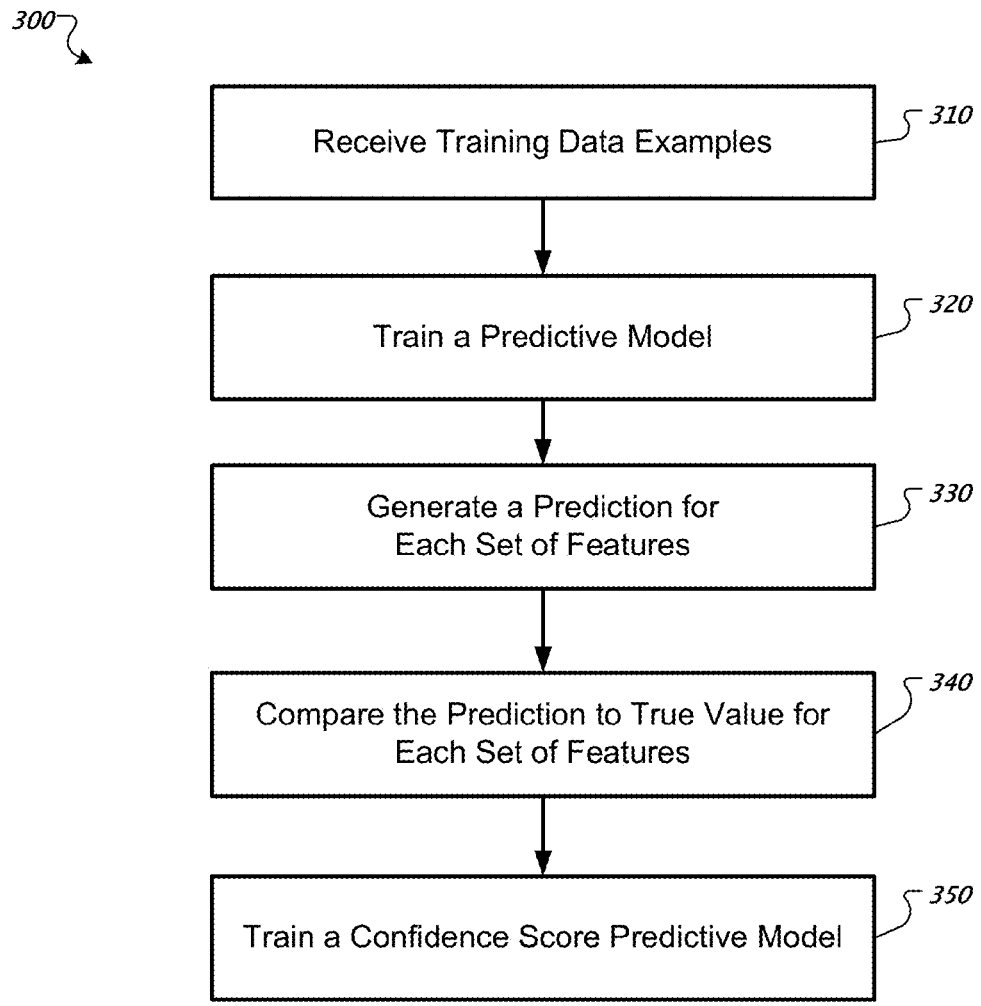
FIG. 3 is a flowchart of an example process for training a confidence score predictive model.

FIG. 3 is a flowchart of an example process for training a confidence score predictive model. The process 300 can be performed by a computer system of one or more computers (e.g., data warehouse 108 implementing model trainers 208, model implementations 210, trained predictive model 212, and confidence score predictive model 214). The system receives training examples for training a predictive model (step 310). Receipt of training examples can be facilitated by a client device communicating over a network, where the client device interacts with the system using an interface, such as prediction interface 110. Training examples typically comprise an <x, y> data pair, where x represents a set of one or more features, and where y represents a corresponding answer.

The system trains a predictive model using a variety of machine learning classifiers, such as logistic regression, nonparametric classification, and ensemble learning (step 320). These trained predictive models may be implemented as model implementations running as computer programs that are capable of providing predictions in response to queries.

Once a predictive model is trained, the system generates training examples for training a confidence score predictive model that corresponds to the trained predictive model. Generation of new training examples is achieved by first generating a prediction for each set of features that was used to train the predictive model (step 330), and by determining a prediction correctness for each set of features (step 340). In other implementations, generation of new training examples is achieved by first generating a prediction for at least some of the sets of features that were used to train the predictive model. In further implementations, predictions can be generated for one or more subsets of the set of features.

The system generates a prediction for each set of features by sending to the trained predictive model queries for each set of features that was previously used to train the predictive model (step 330). In response, the trained predictive model generates a prediction p for each query received. For example, if the training examples used to train the predictive model were formatted as an <x, y> data pair, the system would submit a query for a set of features x in order to obtain a prediction p. In other implementations, the system generates a prediction for each set of features by sending to the trained predictive model queries for at least some of the sets of features that were previously used to train the predictive model.

The system determines a prediction correctness for each set of features (step 340). The prediction correctness reflects whether the trained predictive model was able make an accurate prediction for a given query. In some implementations, a prediction correctness for a query can be determined by comparing a prediction with an answer, where the prediction and answer both correspond to the set of features contained in the query. The prediction correctness is set accordingly based on whether a prediction correctness matches its corresponding answer. For example, using a training example <x, y>, a prediction correctness w can be determined by comparing a prediction p and an answer y, where y is the answer that corresponds to the set of features x, and where p is a prediction for the set of features x that was previously generated in step 330. In a case where prediction p matches answer y, prediction correctness w is set to '1'. Otherwise, prediction correctness w is set to '0'. In further implementations, predictions can be generated for one or more subsets of the set of features.

Using steps 330 and 340, the system generates new training examples comprising an <x, w> data pair, where x represents a set of one or more features, and where w represents a corresponding prediction correctness.

The generated training examples are used to train a confidence score predictive model that corresponds to the trained predictive model (step 350). The system trains the confidence score predictive model using a variety of machine learning classifiers, such as logistic regression, nonparametric classification, and ensemble learning. These trained predictive models may be implemented as model implementations running as computer programs that are capable of providing predictions in response to queries. The trained confidence score predictive model can be used to determine the reliability of a prediction made by the trained predictive model.

Figure 4:
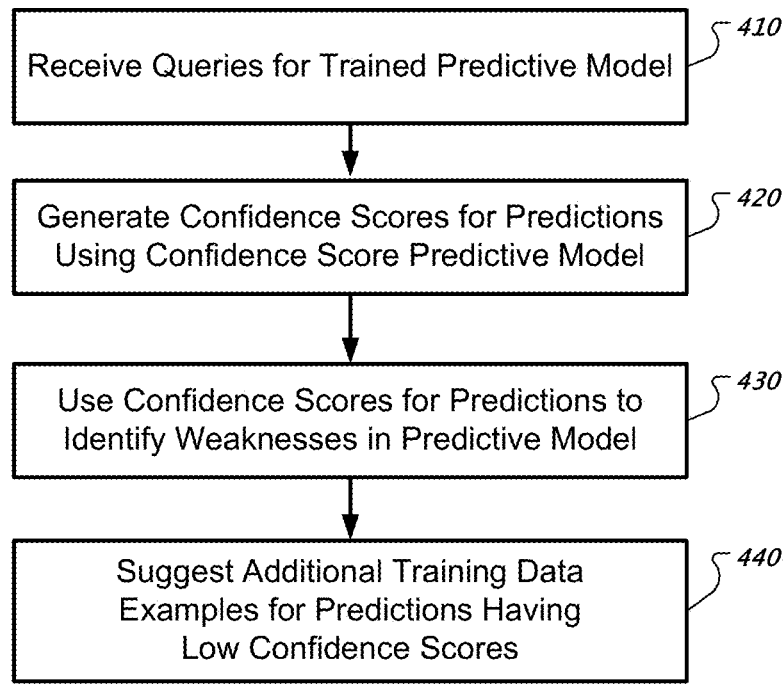
FIG. 4 is a flowchart of an example process for identifying weaknesses in a trained predictive model.

FIG. 4 is flowchart of an example process for identifying weaknesses in a trained predictive model. The process 400 can be performed by a computer system of one or more computers (e.g., data warehouse 108 implementing model trainers 208, trained predictive models 212, and confidence score predictive models 214). Representations of predictive models (e.g., trained predictive model 212 and confidence score predictive model 214) are trained and used by clients (e.g., clients 202, 204 and 206). Each representation is associated with a user (e.g., users 202*a*, 204*a* and 206*a*) and comprises instances of predictive models and corresponding confidence score predictive models.

The system receives queries for a set of features corresponding to a trained predictive model (step 410). Such queries typically comprise a single entry, i.e., a set of features x, where the trained predictive model returns a prediction for the set of features x.

The system generates confidence scores for each query received by the system (step 420). Specifically, the confidence score represents the accuracy of a prediction made by the trained predictive model for a given query. In some implementations, the trained confidence score predictive model can be adapted to provide confidence scores for a categorical model.

The generated confidence scores are used to identify weaknesses in the trained predictive model (step 430). In some implementations, the confidence scores are presented to a user, where the user analyzes the confidence scores and takes appropriate steps needed to increase the accuracy of the trained predictive model. In alternative implementations, the confidence scores are analyzed by the system, which then determines the appropriate steps for increasing the accuracy of the trained predictive model. For example, the system can determine the category or feature space for which accuracy is lacking and add new training examples directed to the deficient category or feature space in order to increase accuracy. The process for identifying weaknesses typically involves determining patterns in the confidence scores. For example, if predictions for a particular category or feature space have low confidence scores, then queries directed to that category or feature space will likely receive inaccurate responses. Accordingly, the trained predictive model is weak for that category or feature space.

In such instances, the accuracy of the trained predictive model can be improved by further training. In particular, a user can provide additional training examples that are directed to the deficient category or feature space (step 440). As a result, the trained predictive model is further trained in a targeted fashion, where the training examples are tailored to remedy the deficient category or features space.

Figure 5:
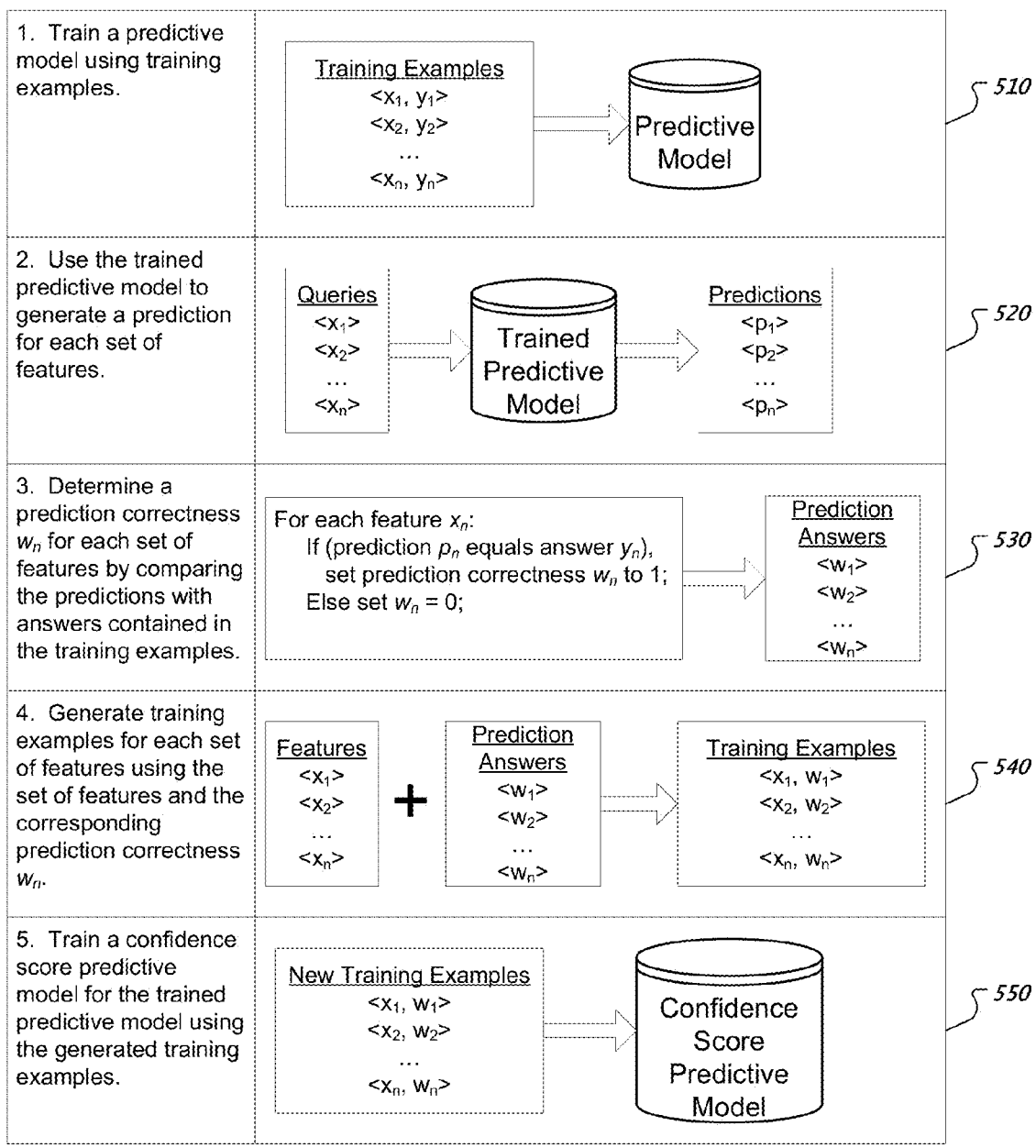
FIG. 5 illustrates an example training process for a confidence score predictive model.

FIG. 5 is an illustration for explaining the training process for a confidence score predictive model. The system trains a predictive model using training examples comprising an <x, y> data pair (step 510). Receipt of training examples can be facilitated by a client device communicating over a network, where the client device interacts with the system using an interface, such as prediction interface 110.

The trained predictive model is used to generate predictions for queries sent to the trained predictive model (step 520). Each query is typically comprised of a set of features that was previously used to train the predictive model in step 510.

The system determines a prediction correctness for each query (step 530). The prediction correctness reflects whether the trained predictive model was able make an accurate prediction for a given query. For example, as shown in step 530, a prediction correctness w is determined by comparing a prediction p and an answer y, where y is the answer that corresponds to a query x, and where p is a prediction for the query x. In a case where the prediction p matches the answer y, the prediction correctness w is set to '1'. Otherwise, the prediction correctness w is set to '0'. In further implementations, predictions can be generated for one or more subsets of the set of features.

The system generates new training examples using the set of features from the original training examples, and their corresponding prediction correctness from step 530 (step 540). The new training examples may comprise an <x, w> data pair, where x represents the set of features, and where w represents the corresponding prediction correctness.

The new training examples are used to train a confidence score predictive model that corresponds to the trained predictive model (step 550). The system trains the confidence score predictive model using a variety of machine learning classifiers, such as logistic regression, nonparametric classification, and ensemble learning. These trained predictive models may be implemented as model implementations running as computer programs that are capable of providing predictions in response to queries. Once training is complete, the confidence score predictive model can be used to determine the accuracy of a prediction made by the trained predictive model.

Figure 6:
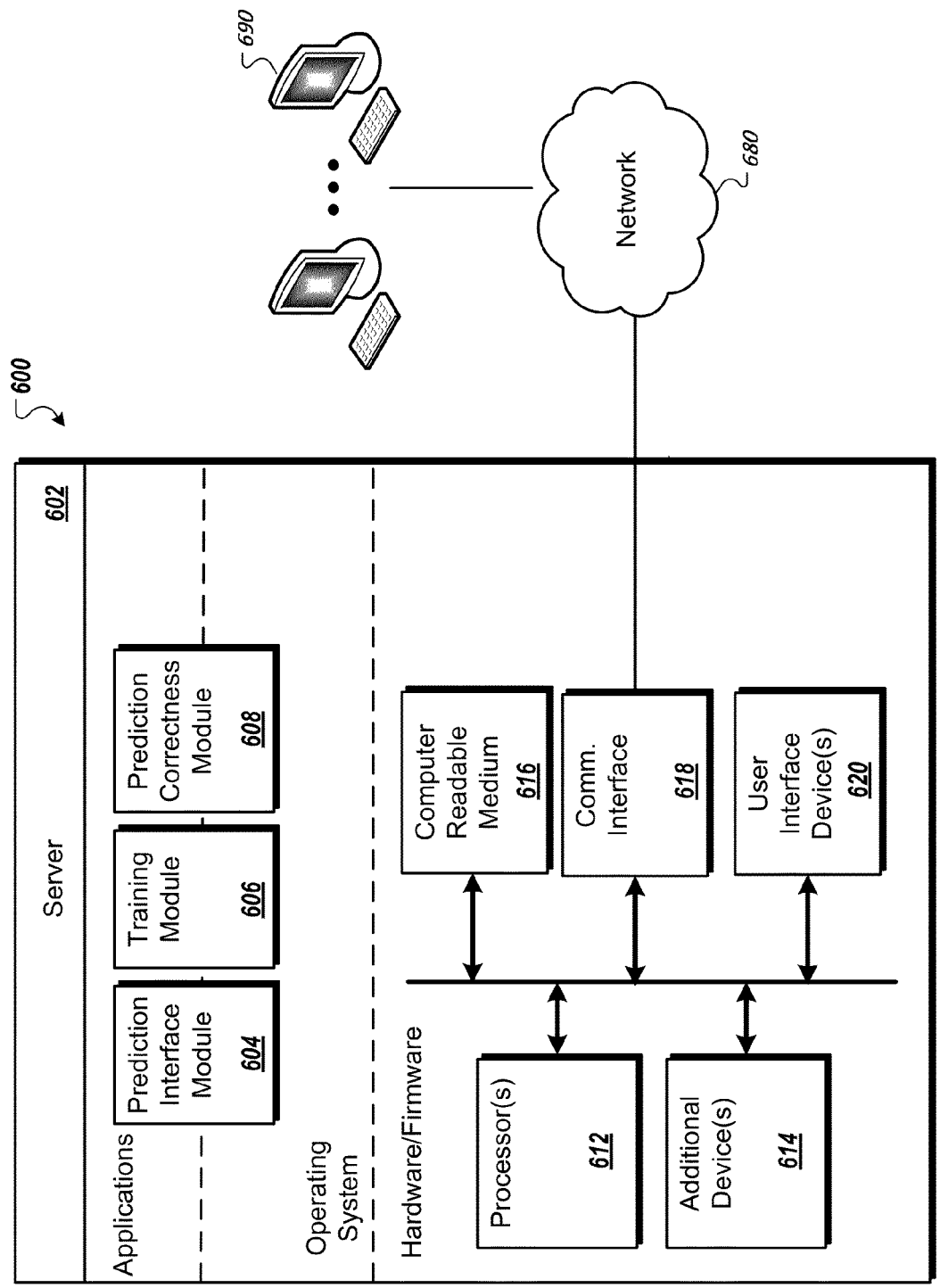
FIG. 6 is a schematic diagram of an example server.

FIG. 6 is a schematic diagram of an example server 602. The server 602 is optionally connected to one or more user or client computers 690 through a network 680. The server 602 consists of one or more data processing apparatuses. While only one data processing apparatus is shown in FIG. 6, multiple data processing apparatus can be used. The server 602 includes various software modules, e.g. executable software programs or libraries, including one or more of: a prediction interface 604, a training module 606, and a prediction correctness module 608. Although several software modules are illustrated, there may be fewer or more software modules. Moreover, the software modules can be distributed on one or more data processing apparatus connected by one or more networks or other suitable communication mediums.

The server 602 also includes hardware or firmware devices including one or more processors 612, one or more additional devices 614, a computer readable medium 616, a communication interface 618, and one or more user interface devices 620. Each processor 612 is capable of processing instructions for execution within the server 602. In some implementations, the processor 612 is a single or multi-threaded processor. Each processor 612 is capable of processing instructions stored on the computer readable medium 616 or on a storage device such as one of the additional devices 614. The server 602 uses its communication interface 618 to communicate with one or more computers 690, for example, over a network 680. Examples of user interface devices 620 include a display, a camera, a speaker, a microphone, a tactile feedback device, a keyboard, and a mouse. The server 602 can store instructions that implement operations associated with the modules described above, for example, on the computer readable medium 616 or one or more additional devices 614, for example, one or more of a floppy disk device, a hard disk device, an optical disk device, or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, the method comprising:
   receiving a plurality of first training examples, wherein each example in the first training examples comprises one or more first features and a first answer;
   training a first predictive model using the first training examples;
   for each example in the first training examples, providing the first features of the example to the trained first predictive model to generate a respective first prediction;
   generating a second training example for each of the first training examples, wherein the second training example comprises the first features of the first training example and an answer that indicates whether the first answer of the first training example matches the respective first prediction of the first training example;
   training a second predictive model using the second training examples;
   using the trained second predictive model to determine a confidence score for a prediction generated by the trained first predictive model;
   determining that the confidence score satisfies a predefined threshold; and
   in response to determining that the confidence score satisfies the predefined threshold, sending the prediction to a client.

2. The method of claim 1, wherein the second predictive model is configured to employ logistic regression techniques.

3. The method of claim 1, wherein the second predictive model is configured to employ nonparametric classification techniques.

4. The method of claim 1, wherein the second predictive model is configured to employ ensemble learning techniques.

5. The method of claim 1, wherein the first predictive model is a categorical model.

6. The method of claim 1, wherein the confidence score represents a probability reflecting an accuracy of the prediction generated by the trained first predictive model.

7. A computer-implemented method, the method comprising:
   receiving a plurality of first training examples, wherein each example in the first training examples comprises one or more first features and a first answer;
   training a first predictive model using the first training examples;

for each example in the first training examples, providing the first features of the example to the trained first predictive model to generate a respective first prediction;

generating a second training example for each of the first training examples, wherein the second training example comprises the first features of the first training example and an answer that indicates whether the first answer of the first training example matches the respective first prediction of the first training example;

training a second predictive model using the second training examples;

using the trained second predictive model to determine a confidence score for a prediction generated by the trained first predictive model;

determining that the confidence score does not satisfy a predefined threshold; and in response to determining that the confidence score does not satisfy the predefined threshold, indicating to a client that the confidence score has failed to satisfy the predefined threshold.

8. A computer-implemented method, the method comprising:

receiving a plurality of first training examples, wherein each example in the first training examples comprises one or more first features and a first answer;

training a first predictive model using the first training examples;

for each example in the first training examples, providing the first features of the example to the trained first predictive model to generate a respective first prediction;

generating a second training example for each of the first training examples, wherein the second training example comprises the first features of the first training example and an answer that indicates whether the first answer of the first training example matches the respective first prediction of the first training example;

training a second predictive model using the second training examples;

using the trained second predictive model to determine a confidence score for a prediction generated by the trained first predictive model;

receiving a plurality of queries;

generating confidence scores for the queries using the trained second predictive model; and identifying queries having confidence scores that fail to meet a predefined threshold.

9. A computer-implemented method, the method comprising:

receiving a plurality of first training examples, wherein each example in the first training examples comprises one or more first features and a first answer;

training a first predictive model using the first training examples;

for each example in the first training examples, providing the first features of the example to the trained first predictive model to generate a respective first prediction;

generating a second training example for each of the first training examples, wherein the second training example comprises the first features of the first training example and an answer that indicates whether the first answer of the first training example matches the respective first prediction of the first training example;

training a second predictive model using the second training examples; and using the trained second predictive model to determine a confidence score for a prediction generated by the trained first predictive model, wherein training of the second trained predictive model is accomplished on a streaming basis wherein the second trained predictive model is further trained upon receipt of additional training examples for training the first predictive model.

10. A system comprising:

a storage medium having instructions stored thereon; and data processing apparatus operable to execute the instructions to perform operations comprising:

receiving a plurality of first training examples, wherein each example in the first training examples comprises one or more first features and a first answer;

training a first predictive model using the first training examples;

for each example in the first training examples, providing the first features of the example to the trained first predictive model to generate a respective first prediction;

generating a second training example for each of the first training examples, wherein the second training example comprises the first features of the first training example and an answer that indicates whether the first answer of the first training example matches the respective first prediction of the first training example;

training a second predictive model using the second training examples;

using the trained second predictive model to determine a confidence score for a prediction generated by the trained first predictive model;

determining that the confidence score satisfies a predefined threshold; and in response to determining that the confidence score satisfies the predefined threshold, sending the prediction to a client.

11. The system of claim 10, wherein the second predictive model is configured to employ logistic regression techniques.

12. The system of claim 10, wherein the second predictive model is configured to employ nonparametric classification techniques.

13. The system of claim 10, wherein the second predictive model is configured to employ ensemble learning techniques.

14. The system of claim 10, wherein the first predictive model is a categorical model.

15. The system of claim 10, wherein the confidence score represents a probability reflecting an accuracy of the prediction generated by the trained first predictive model.

16. A system comprising:

a storage medium having instructions stored thereon; and data processing apparatus operable to execute the instructions to perform operations comprising:

receiving a plurality of first training examples, wherein each example in the first training examples comprises one or more first features and a first answer;

training a first predictive model using the first training examples;

for each example in the first training examples, providing the first features of the example to the trained first predictive model to generate a respective first prediction;

generating a second training example for each of the first training examples, wherein the second training example comprises the first features of the first training example and an answer that indicates whether the first answer of the first training example matches the respective first prediction of the first training example;

training a second predictive model using the second training examples;
using the trained second predictive model to determine a confidence score for a prediction generated by the trained first predictive model;
determining that the confidence score does not satisfy a predefined threshold; and
in response to determining that the confidence score does not satisfy the predefined threshold, indicating to a client that the confidence score has failed to satisfy the predefined threshold.

17. A system comprising:
a storage medium having instructions stored thereon; and
data processing apparatus operable to execute the instructions to perform operations comprising:
receiving a plurality of first training examples, wherein each example in the first training examples comprises one or more first features and a first answer;
training a first predictive model using the first training examples;
for each example in the first training examples, providing the first features of the example to the trained first predictive model to generate a respective first prediction;
generating a second training example for each of the first training examples, wherein the second training example comprises the first features of the first training example and an answer that indicates whether the first answer of the first training example matches the respective first prediction of the first training example;
training a second predictive model using the second training examples;
using the trained second predictive model to determine a confidence score for a prediction generated by the trained first predictive model;
receiving a plurality of queries;
generating confidence scores for the queries using the trained second predictive model; and
identifying queries having confidence scores that fail to meet a predefined threshold.

18. A system comprising:
a storage medium having instructions stored thereon; and
data processing apparatus operable to execute the instructions to perform operations comprising:
receiving a plurality of first training examples, wherein each example in the first training examples comprises one or more first features and a first answer;
training a first predictive model using the first training examples;
for each example in the first training examples, providing the first features of the example to the trained first predictive model to generate a respective first prediction;
generating a second training example for each of the first training examples, wherein the second training example comprises the first features of the first training example and an answer that indicates whether the first answer of the first training example matches the respective first prediction of the first training example;
training a second predictive model using the second training examples; and
using the trained second predictive model to determine a confidence score for a prediction generated by the trained first predictive model,
wherein training of the second trained predictive model is accomplished on a streaming basis wherein the second trained predictive model is further trained upon receipt of additional training examples for training the first predictive model.

19. A storage medium having instructions stored thereon which, when executed by a data processing apparatus, cause the data processing apparatus to perform operations comprising:
receiving a plurality of first training examples, wherein each example in the first training examples comprises one or more first features and a first answer;
training a first predictive model using the first training examples;
for each example in the first training examples, providing the first features of the example to the trained first predictive model to generate a respective first prediction;
generating a second training example for each of the first training examples, wherein the second training example comprises the first features of the first training example and an answer that indicates whether the first answer of the first training example matches the respective first prediction of the first training example;
training a second predictive model using the second training examples;
using the trained second predictive model to determine a confidence score for a prediction generated by the trained first predictive model,
determining that the confidence score satisfies a predefined threshold; and
in response to determining that the confidence score satisfies the predefined threshold, sending the prediction to a client.

20. The storage medium of claim 19, wherein the second predictive model is configured to employ logistic regression techniques.

21. The storage medium of claim 19, wherein the second predictive model is configured to employ nonparametric classification techniques.

22. The storage medium of claim 19, wherein the second predictive model is configured to employ ensemble learning techniques.

23. The storage medium of claim 19, wherein the first predictive model is a categorical model.

24. The storage medium of claim 19, wherein the confidence score represents a probability reflecting an accuracy of the prediction generated by the trained first predictive model.

25. A storage medium having instructions stored thereon which, when executed by a data processing apparatus, cause the data processing apparatus to perform operations comprising:
receiving a plurality of first training examples, wherein each example in the first training examples comprises one or more first features and a first answer;
training a first predictive model using the first training examples;
for each example in the first training examples, providing the first features of the example to the trained first predictive model to generate a respective first prediction;
generating a second training example for each of the first training examples, wherein the second training example comprises the first features of the first training example and an answer that indicates whether the first answer of the first training example matches the respective first prediction of the first training example;
training a second predictive model using the second training examples;

using the trained second predictive model to determine a confidence score for a prediction generated by the trained first predictive model;

determining that the confidence score does not satisfy a predefined threshold; and in response to determining that the confidence score does not satisfy the predefined threshold, indicating to a client that the confidence score has failed to satisfy the predefined threshold.

26. A storage medium having instructions stored thereon which, when executed by a data processing apparatus, cause the data processing apparatus to perform operations comprising:

receiving a plurality of first training examples, wherein each example in the first training examples comprises one or more first features and a first answer;

training a first predictive model using the first training examples;

for each example in the first training examples, providing the first features of the example to the trained first predictive model to generate a respective first prediction;

generating a second training example for each of the first training examples, wherein the second training example comprises the first features of the first training example and an answer that indicates whether the first answer of the first training example matches the respective first prediction of the first training example;

training a second predictive model using the second training examples;

using the trained second predictive model to determine a confidence score for a prediction generated by the trained first predictive model;

receiving a plurality of queries;

generating confidence scores for the queries using the trained second predictive model; and identifying queries having confidence scores that fail to meet a predefined threshold.

27. A storage medium having instructions stored thereon which, when executed by a data processing apparatus, cause the data processing apparatus to perform operations comprising:

receiving a plurality of first training examples, wherein each example in the first training examples comprises one or more first features and a first answer;

training a first predictive model using the first training examples;

for each example in the first training examples, providing the first features of the example to the trained first predictive model to generate a respective first prediction;

generating a second training example for each of the first training examples, wherein the second training example comprises the first features of the first training example and an answer that indicates whether the first answer of the first training example matches the respective first prediction of the first training example;

training a second predictive model using the second training examples; and using the trained second predictive model to determine a confidence score for a prediction generated by the trained first predictive model, wherein training of the second trained predictive model is accomplished on a streaming basis wherein the second trained predictive model is further trained upon receipt of additional training examples for training the first predictive model.

* * * * *